(No Model.) 2 Sheets—Sheet 1.
F. C. RUFFHEAD & E. J. SCHEER.
ADJUSTABLE BICYCLE PARASOL AND SUPPORT.
No. 555,025. Patented Feb. 18, 1896.
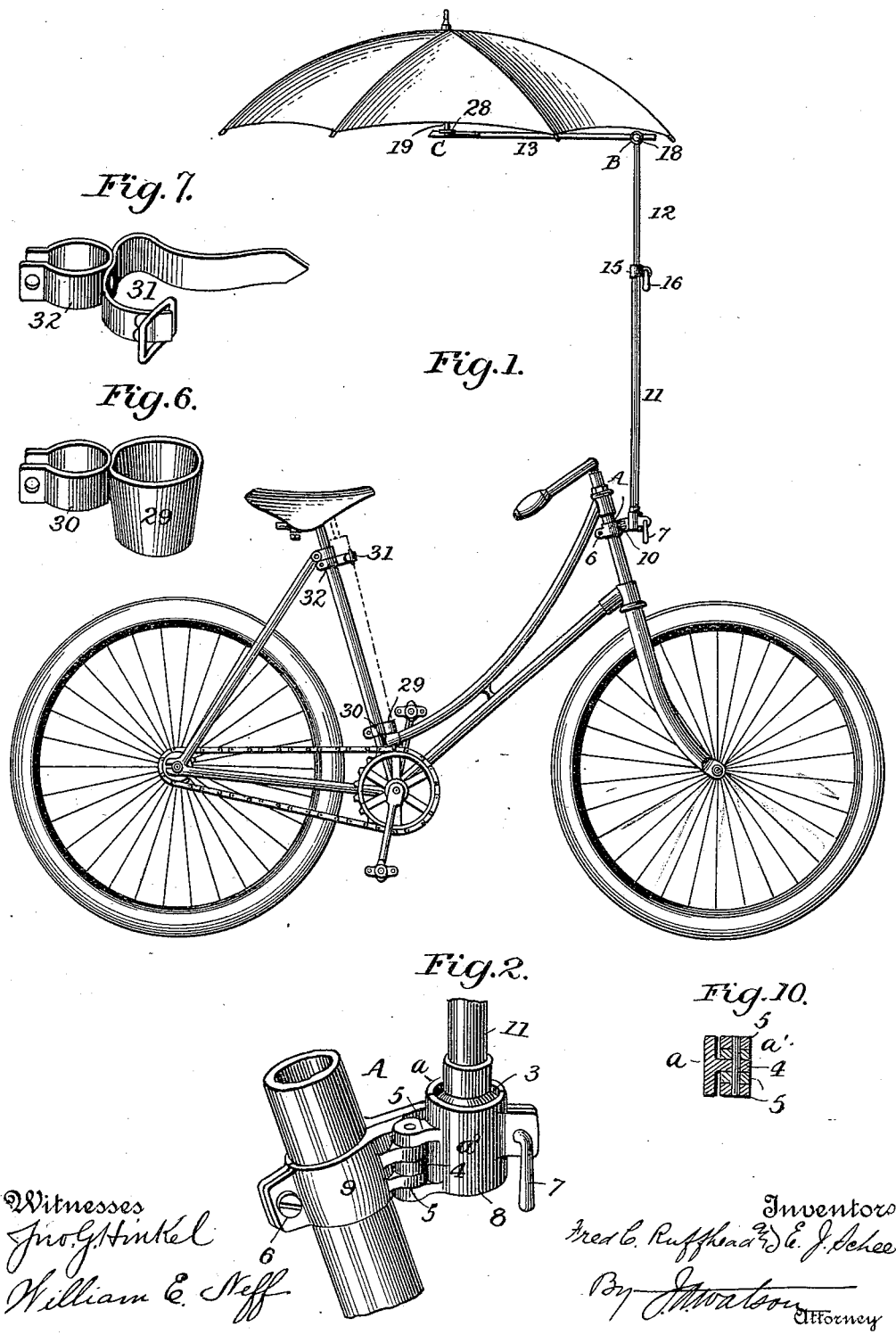

(No Model.) 2 Sheets—Sheet 2.
F. C. RUFFHEAD & E. J. SCHEER.
ADJUSTABLE BICYCLE PARASOL AND SUPPORT.
No. 555,025. Patented Feb. 18, 1896.
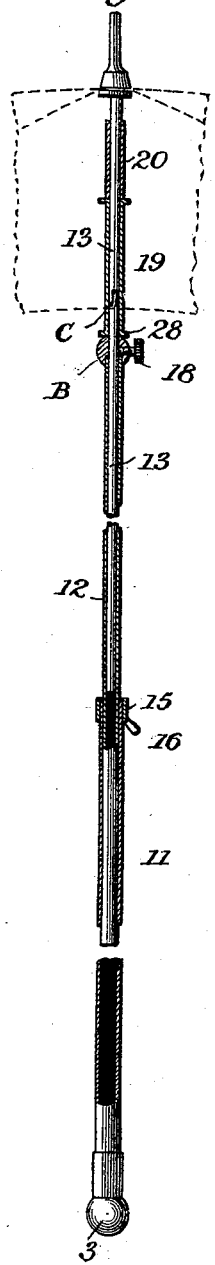
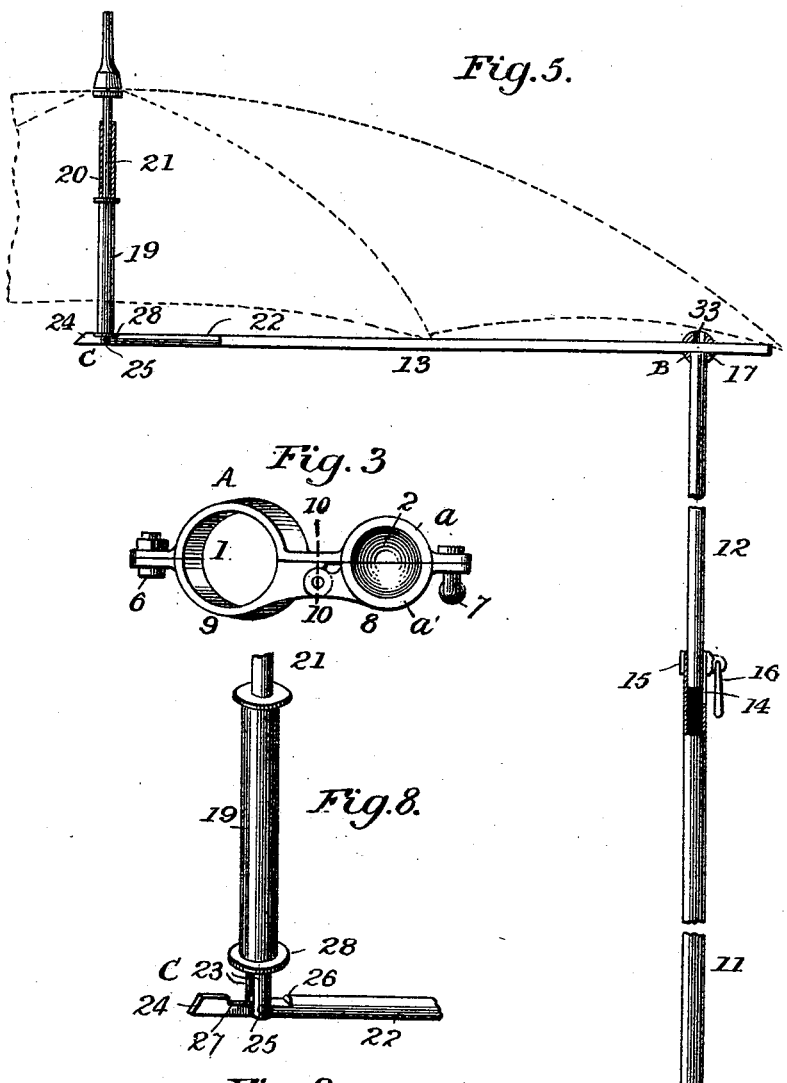
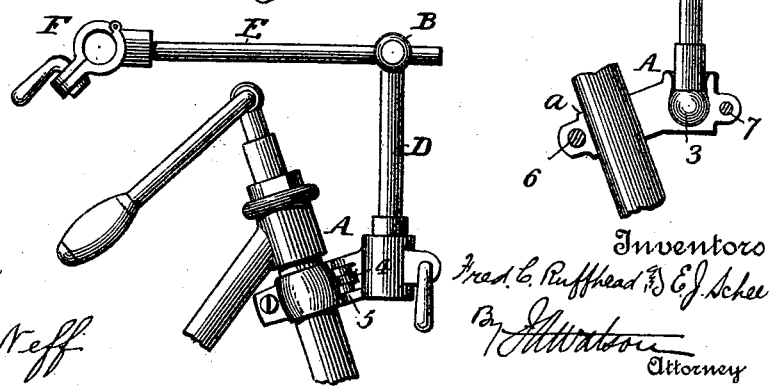
Witnesses
Jno. G. Hinkel
William E. Neff
Inventors
Fred C. Ruffhead and E. J. Scheer
By J. H. Watson
Attorney

UNITED STATES PATENT OFFICE.

FRED C. RUFFHEAD AND EMIL J. SCHEER, OF ROCHESTER, NEW YORK.

ADJUSTABLE BICYCLE-PARASOL AND SUPPORT.

SPECIFICATION forming part of Letters Patent No. 555,025, dated February 18, 1896.

Application filed September 12, 1895. Serial No. 562,322. (No model.)

*To all whom it may concern:*

Be it known that we, FRED C. RUFFHEAD and EMIL J. SCHEER, citizens of the United States, residing at Rochester, in the county of Monroe and State of New York, have invented certain new and useful Improvements in Adjustable Bicycle-Parasols and Supports, of which the following is a specification.

Our invention relates to new and useful improvements in bicycle parasols and umbrellas and in devices for supporting the same upon bicycles and similar vehicles, and it has for its object to provide a parasol or umbrella which can be readily attached to and detached from the bicycle-frame, which is adapted for use on various kinds of bicycles or tricycles, and which may be readily adjusted both vertically and horizontally, so as to most effectually shade the rider of the vehicle. In the following specification we shall, for convenience, use the single term "parasol" in describing the invention.

Our improved parasol can also be readily detached and carried in the hand in the ordinary way, and its construction is such that the mechanism for the various adjustments do not interfere with the ordinary hand use. The parasol may be folded so as to occupy small space, and when not in use may be strapped to the frame of the wheel out of the way of the rider.

Referring to the drawings, in which like reference-signs refer to similar parts throughout the several views, Figure 1 is a side view of our invention as applied to a lady's bicycle. Fig. 2 is a perspective view of the bracket for supporting the parasol-rod on the frame of the bicycle. Fig. 3 is a plan view of the same. Fig. 4 is a sectional view of the parasol-support, looking from the rear, showing the means for vertical adjustment. Fig. 5 is a sectional view showing the means for lateral adjustment, the plane of section being at right angles to the section-plane of Fig. 4. Figs. 6 and 7 are details of the strap and pocket for attaching the parasol to the wheel-frame. Fig. 8 is a detail view of the right-angle joint. Fig. 9 shows a modified form of attachment for holding an ordinary umbrella or parasol on a bicycle, and Fig. 10 is a section on line 10 10 of Fig. 3.

Referring to the drawings, A indicates a bracket for securing the parasol to the bicycle, preferably to the head. This bracket consists of a clamp 1, which encircles the head of the bicycle, and a socketed receptacle 2 for receiving the ball 3 of the parasol-handle. The bracket A is made of two somewhat similar sections $a$ and $a'$, which are fastened together by clamping-screws 6 and 7 at their ends and by a hinge-joint midway between the ends. The section $a$ is made of one continuous piece of metal, while the section $a'$ is made in two parts 8 and 9, hinged together and to the section $a$. A part 4 of the hinge is integral with section $a$ and the other parts 5 are integral with the parts of section $a'$, thus connecting said parts of section $a'$ together and to the section $a$. By this construction the bracket may be readily attached to the bicycle-head by removing the nut on the set-screw 6, swinging the part 9 backward and then clamping the parts on the head. Similarly the part 8 may be manipulated to adjust the ball 3 in the socket by turning the nut on the clamping-screw 7. It will be seen that by having part of the hinge on section $a$ the bracket is held firmly in the center and cannot spread.

The parasol-handle consists of three adjustable telescoping sections 11, 12, and 13. To the section 11 is permanently secured the ball 3, which fits into the socket 2 of the bracket. The upper end of the lower section, 11, has a vertical slit 14 to allow of compression, and it is provided with a clamp in the form of a split collar 15 having a clamping-screw 16. The middle section, 12, slides telescopically within the section 11 and may be secured in any desired position by means of the clamp 15. The upper end of section 12 terminates in a ball-fitting B, which has a vertical perforation 33 in line with the opening of the tube 12 and a horizontal perforation 17, as shown, and is provided with a set-screw 18 at the intersection of said perforations. The perforations in the fitting B are of proper size to receive the uppermost section, 13, and it may be held in any adjustment therein by the set-screw. When the parasol is in the vertical position, as shown in Fig. 4, the rod 13 fits into the section 12 and may be secured at any elevation by the set-screw 18. When it is desired to set the parasol back directly over the rider, as shown in Figs. 1 and 5, the rod 13 is passed through the horizontal perforation 17 in the fitting B and is secured therein and bent at right angles by a joint C to be presently described.

The sleeve or runner 19, to which the ribs are connected by the usual rods or braces and which slides upon the rod 13 for the purpose of opening and closing the parasol, is made long enough to cover the joint C and render it rigid when the joint is straight, as shown in Fig. 4. Above the sleeve 19 is a short sleeve 20, which is designed to limit the upward movement of the sleeve 19 and prevent opening the parasol too far and straining it.

We will now describe the vertical adjustment, as illustrated in Fig. 4. The section 12 is inserted in the section 11 and clamped at the proper height by means of the clamp 15. The parasol is then raised, the sleeve 19 being pushed upward on the rod 13 until it covers the joint C, and the rod 13 is then inserted in the section 12 until the lower end of the sleeve rests on the fitting B. The screw 18 is then tightened, after which the parasol may be clamped to the bicycle and set at any desired angle by means of the ball-and-socket joint 2 3 or carried in the hand, if desired, when not using the wheel.

In order to provide for the horizontal adjustment, (shown in Figs. 1 and 5,) the rod 13 is made in two parts 21 and 22 united by the joint C, Fig. 8. The lower end of the upper portion, 21, is bifurcated, forming two legs 23. The upper end 24 of the lower portion, 22, is formed into a tongue which is pivoted at 25 between the legs 23. The tongue 24 is cut away at 26 and 27 to form a flat bearing-surface for a flange 28 on the lower end of sleeve 19. The adjustment is as follows: The sections 11 and 12 are adjusted as before for the desired angle and height. The sleeve 19 is then pushed upward on the rod 13 until it has passed the joint C. The joint is then bent until the two parts 21 and 22 are at a right angle, after which the sleeve 19 is returned by the elasticity of the parasol until the flange 28 rests in the seat 26 27. The flange 28, when seated on the bearing 26 27, locks the joint C in the right-angled position firmly. The rod 13 is then inserted in the horizontal perforation in the fitting B and secured by the set-screw 18. To straighten out the rod 13 again the operation is reversed.

When the parasol is not in use, it may be folded and strapped under the upper bar of the diamond-frame bicycle, or, in a lady's bicycle, on the bar which reaches from the saddle-post to the crank-axle box, as shown in dotted lines in Fig. 1. For this purpose we provide a pocket 29, preferably made of leather, which is attached to the bar near one end by a clip 30, and at the other end of the bar we provide a strap 31, secured by a clip 32. The rods 11 and 13 are removed from the bracket and telescoped, the parasol is wrapped, and one end of each is inserted in the pocket 29, while the other ends are bound by the strap 31.

In order to hold a parasol which is not especially adapted for use on bicycles we may use a modification shown in Fig. 9. In this modification an upright rod D is secured to the frame of the machine by a bracket A, having a ball-and-socket joint, and on the upper end of the rod is a fitting B similar to the one described above. A rod E passes through the fitting and is secured therein by a set-screw. The rod E may be inserted vertically through the fitting into the rod D in order to hold the parasol forward, or it may be inserted horizontally, as shown, to hold the parasol directly over the rider. On the end of the rod E is a clamp F of any suitable kind, in which the handle of an ordinary umbrella may be inserted and securely held.

Having fully described our invention, what we claim, and desire to secure by Letters Patent, is—

1. The combination in a parasol or umbrella, of a handle having two sections 12, 13, the upper section 13 consisting of two parts hinged together and adapted to be set straight or at right angles, a sleeve or runner arranged to slide upon said upper section and to cover the joint when the handle is straight, a fitting upon the lower section 12 having two perforations respectively at right angles and in line with said section and having a clamping-screw 18, the said section 12 being hollow and adapted to receive the lower part of the section 13, and said fitting being adapted to form a support for the runner when the sections are telescoped, substantially as described.

2. The combination with a clamp such as A, adapted to be secured to a bicycle, of a parasol or umbrella, a handle for the same consisting of a plurality of separable sections arranged to slide telescopically, the lower section being connected to said clamp, the middle section having its lower end telescoping with the lower section and its upper end provided with a fitting having vertical and horizontal openings, and the upper section being adapted to slide in either of the openings of the fitting and being provided with a joint whereby the upper section may be arranged straight or set at a right angle, substantially as described.

3. The combination with a bicycle of a supporting-clamp consisting of two sections provided with clamping-screws, one section being rigid and the other section composed of two parts hinged together, said sections embracing two openings, one opening to receive a bar or tube of the bicycle-frame, and the other opening adapted to receive the handle of a parasol or other article to be supported, substantially as described.

4. The supporting-clamp for attachment to bicycles consisting of sections $a$ and $a'$, one of said sections being rigid and the other made in two parts and hinged centrally together and to the first-named section, an opening between said sections at one end adapted to receive the tube of the bicycle-frame, and a socket included between the sections at the other end thereof and adapted to receive a ball upon the article to be supported, substantially as described.

In testimony whereof we affix our signatures in presence of two witnesses.

FRED C. RUFFHEAD.
EMIL J. SCHEER.

Witnesses:
ROY C. WEBSTER,
CHAS. F. BAKER.